United States Patent
Powers, Jr. et al.

(10) Patent No.: US 7,370,899 B2
(45) Date of Patent: May 13, 2008

(54) RETRACTABLE LADING SUPPORT

(75) Inventors: Robert G. Powers, Jr., Bradenton, FL (US); Jay R. Costa, Tierra Verde, FL (US); Michael P. Linsenman, Bradenton, FL (US); Harvey Jay Campbell, Bradenton, FL (US)

(73) Assignee: Tropicana Products, Inc., Bradenton, FL (US)

( * ) Notice: Subject to any disclaimer, the term of this patent is extended or adjusted under 35 U.S.C. 154(b) by 0 days.

(21) Appl. No.: 10/960,829

(22) Filed: Oct. 7, 2004

(65) Prior Publication Data

US 2006/0076791 A1 Apr. 13, 2006

(51) Int. Cl.
*B62D 33/04* (2006.01)

(52) U.S. Cl. .................... 296/24.4; 296/186.1

(58) Field of Classification Search ............. 296/24.44, 296/182.1, 186.1; 105/375; 248/235, 240, 248/240.3, 244.46, 240.4; 410/129, 140, 410/54; 108/44
See application file for complete search history.

(56) References Cited

U.S. PATENT DOCUMENTS

| | | | | |
|---|---|---|---|---|
| 2,808,789 A | | 10/1957 | Stough | |
| 2,930,074 A | * | 3/1960 | Marks | 16/263 |
| 2,953,104 A | | 9/1960 | Oakley | |
| 2,973,724 A | | 3/1961 | Miller et al. | |
| 3,026,820 A | | 3/1962 | Stough | |
| 3,095,830 A | | 7/1963 | Runken | |
| 3,182,610 A | | 5/1965 | Jones | |
| 3,352,595 A | | 11/1967 | Bezlaj | |
| 3,370,882 A | * | 2/1968 | Morgan | 296/24.44 |
| 3,431,015 A | | 3/1969 | Breen | |
| 3,516,368 A | | 6/1970 | Wright | |
| 3,680,491 A | | 8/1972 | Chapman et al. | |
| 3,805,709 A | | 4/1974 | Schuller et al. | |
| 3,875,871 A | * | 4/1975 | Thornton et al. | 105/375 |
| 3,974,781 A | | 8/1976 | Josephson | |
| 4,281,870 A | * | 8/1981 | Ehrlich et al. | 296/24.44 |
| 4,348,963 A | | 9/1982 | Dancy | |
| 4,613,174 A | | 9/1986 | Berg et al. | |
| 4,762,258 A | * | 8/1988 | Murphy | 108/44 |
| 5,375,534 A | * | 12/1994 | Adams | 105/375 |
| 5,452,972 A | | 9/1995 | Adams | |
| 5,463,795 A | | 11/1995 | Carlson et al. | |
| 5,794,537 A | | 8/1998 | Zaerr et al. | |
| 6,003,445 A | | 12/1999 | Coslovi et al. | |
| 6,062,780 A | | 5/2000 | Petelka | |
| 6,585,306 B1 | * | 7/2003 | Smith et al. | 296/24.44 |

(Continued)

*Primary Examiner*—Jason S Morrow
(74) *Attorney, Agent, or Firm*—Banner & Witcoff, Ltd.

(57) ABSTRACT

A lading storage device is provided for more effectively utilizing the interior of the storage device. The storage device comprises a pair of at least generally opposed walls and a retractable lading support on each of the walls. The retractable lading supports are in opposed relation to each other and each comprise a retractable support member. Typically, each retractable support member is movable between an extended position, wherein the retractable support member extends into an interior of the lading storage device, and a retracted position, wherein the retractable support member is generally upright. Preferably, at least one of the walls includes a recess in a portion of the wall, wherein the retractable lading support is disposed within the recess when the retractable lading support is in its retracted position. A method of using the lading storage device is also provided.

21 Claims, 6 Drawing Sheets

U.S. PATENT DOCUMENTS

| | | |
|---|---|---|
| 6,612,793 B2 | 9/2003 | Coslovi et al. |
| 6,688,820 B2 | 2/2004 | Ootsuka |
| 6,691,370 B2 | 2/2004 | Tatara |
| 6,704,991 B1 | 3/2004 | Coulborn et al. |
| 6,854,400 B2 * | 2/2005 | Sullivan ................ 105/375 |
| 2003/0217670 A1 | 11/2003 | Sullivan |

* cited by examiner

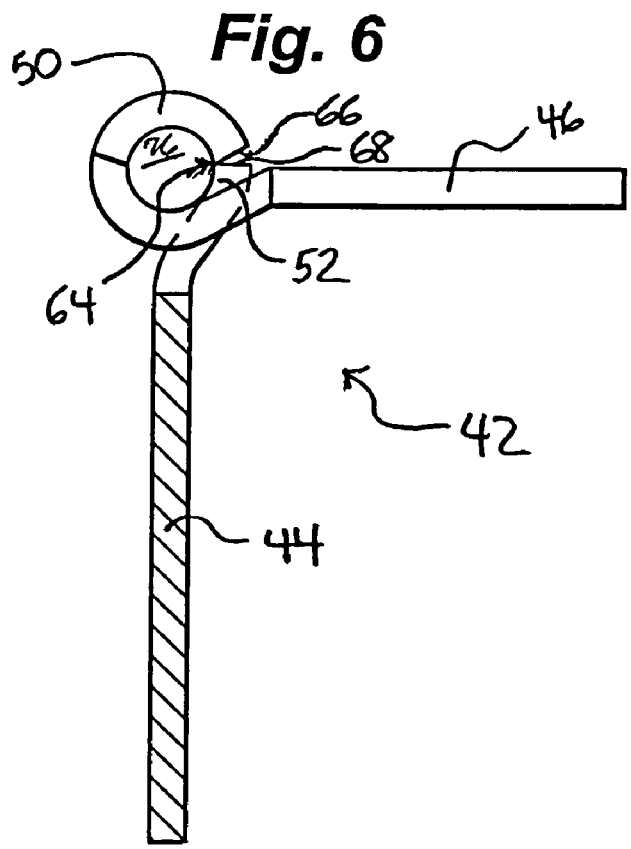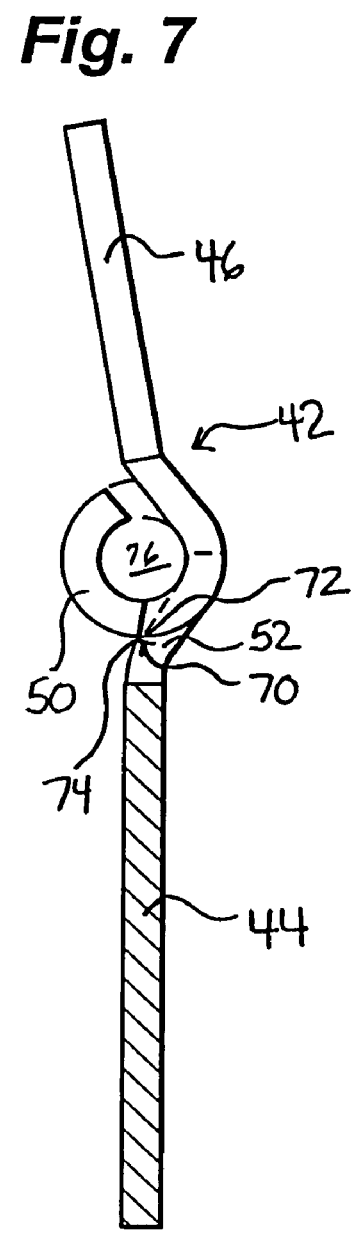

RETRACTABLE LADING SUPPORT

FIELD OF THE INVENTION

The present invention relates to an improved lading storage device which enables more efficient use of its interior space and a method of using the lading storage device.

BACKGROUND OF THE INVENTION

Numerous examples exist of lading storage devices such as, for example, railroad cars, trucks, trailers, cargo containers and the like. Such devices have an interior space in which to store lading (freight). It is known in the art to support and separate lading within the interior storage space by panels or shelves which create a two-tiered storage system. However, construction of such two-tiered systems often requires components, such as rails, brackets, and supports, which project into the limited interior space and which interfere with uses of the interior space that do not require two tiers. Furthermore, lading is often shipped long distances, as in, for example, cross country. Therefore, efficient use of the interior lading volume is important to maximize the benefit of time and money expended, maximize the amount of lading delivered, and to facilitate rapid loading and unloading of the transported lading. Therefore, there is a need for an improved lading storage device and a method which enables more efficient use of the interior space of the lading storage device.

SUMMARY OF THE INVENTION

In accordance with the present invention, a lading storage device is provided having a pair of at least generally opposed walls and a retractable lading support on each of the walls in opposed relation to one another. Each retractable lading support comprises a retractable support member movable between an extended position and a retracted position.

When an opposed pair of retractable lading supports are in their extended positions, a lading support member can be mounted, or the lading placed directly, on top of the opposed pair of retractable lading supports to support lading that bears weight on the lading support member. Typically such lading will be above the retractable lading supports and other lading may be stowed below the retractable lading supports. The stowed lading may be stored in any form which is conducive for storage and delivery of the goods, such as stacking the goods on pallets.

In accordance with one aspect of the present invention, the retractable support members each comprise a hinged member having a retractable supporting portion. "Hinged member" is intended to include a pivotable member. Retractable supporting portions are movable between an extended position, wherein the retractable supporting portions extend into an interior of the lading storage device, and a retracted position, wherein the retractable supporting portions are generally upright or otherwise generally removed or withdrawn from the lading volume. In one embodiment, the hinged members are in an extended position when the retractable support members are in about a 90° relation to an associated wall of the lading storage device and in a retracted position when the supporting position has been rotated about 90° or more from the extended position.

In accordance with another aspect of the present invention, at least one of the opposed walls includes a recess in a portion of the wall within which a retractable lading support is disposed when the retractable lading support is in its retracted position. Typically, the lading support is at least partially and preferably fully contained in the recess when the lading support is in its retracted position.

In accordance with another aspect of the present invention, the hinged member further comprises a fixed portion which is directly or indirectly fixedly secured to one of the walls. The retractable supporting portion of the hinged member is movable with respect to the fixed portion from the extended position to the retracted position. Any suitable structure or method for directly or indirectly fixedly securing the fixed portion of the hinged member to an associated one of the walls may be utilized, such as a mounting bracket and standard nuts and bolts or welding, for example.

In accordance with another aspect of the present invention, the hinged member includes one or more stops for preventing rotation of the retractable supporting portion from extending into a position below about 90° relative to the fixed portion or below about horizontal when in the extended position, and when in a retracted position, preferably more than 90° or 100° from the extended position.

In accordance with another aspect of the present invention, the hinged member includes one or more second stops for preventing said retractable supporting portion from rotating more than about 115° from the extended position.

In accordance with yet another aspect of the present invention, a method of storing lading is provided. The method comprises: providing a retractable lading support on each of a generally opposed pair of walls, preferably by disposing the opposed retractable lading supports on the same generally horizontal plane, the lading retractable supports in opposed relation to each other and each comprising a retractable support member movable between extended and retracted positions; moving the retractable support members to an extended position; and placing a lading support member (or lading) that spans and is supported by the opposed retractable support members when the retractable support members are in the extended position. Thus lading can be placed directly on the extended lading support member, although it is typically contemplated that lading will be placed on a lading support member that bears on the extended support member.

In accordance with another aspect of the invention, the method further comprises placing lading on the lading support member (or directly on the extended support members), transporting the lading storage device to a desired destination, unloading the lading (typically from the lading support member), removing the lading support member (if used) from the opposed retractable lading supports, and moving (rotating) the lading support members to their retracted position.

Typically, the retractable lading supports are in the extended position when the retractable support members are in about a 90 degree relation to an associated one of the walls.

In accordance with another aspect of the invention, providing a retractable lading support on an opposed pair of walls comprises mounting each of the lading supports in a respective recess in the adjacent wall so that when in a retracted position, the lading support is fully contained in the respective recess.

In accordance with still another aspect of the present invention, the method further comprises engaging a stop member associated with the retractable support member to prevent it from extending into a position below about horizontal when in the extended position.

Other advantages and features of the invention will become apparent from the following description and from reference to the drawings.

BRIEF DESCRIPTION OF THE DRAWINGS

FIG. 6 is a side elevation view of the retractable lading support along line 6-6 of FIG. 4; and FIG. 7 is a side elevation view of the retractable lading support along line 7-7 of FIG. 3.

DETAILED DESCRIPTION OF THE INVENTION

Figure 1:
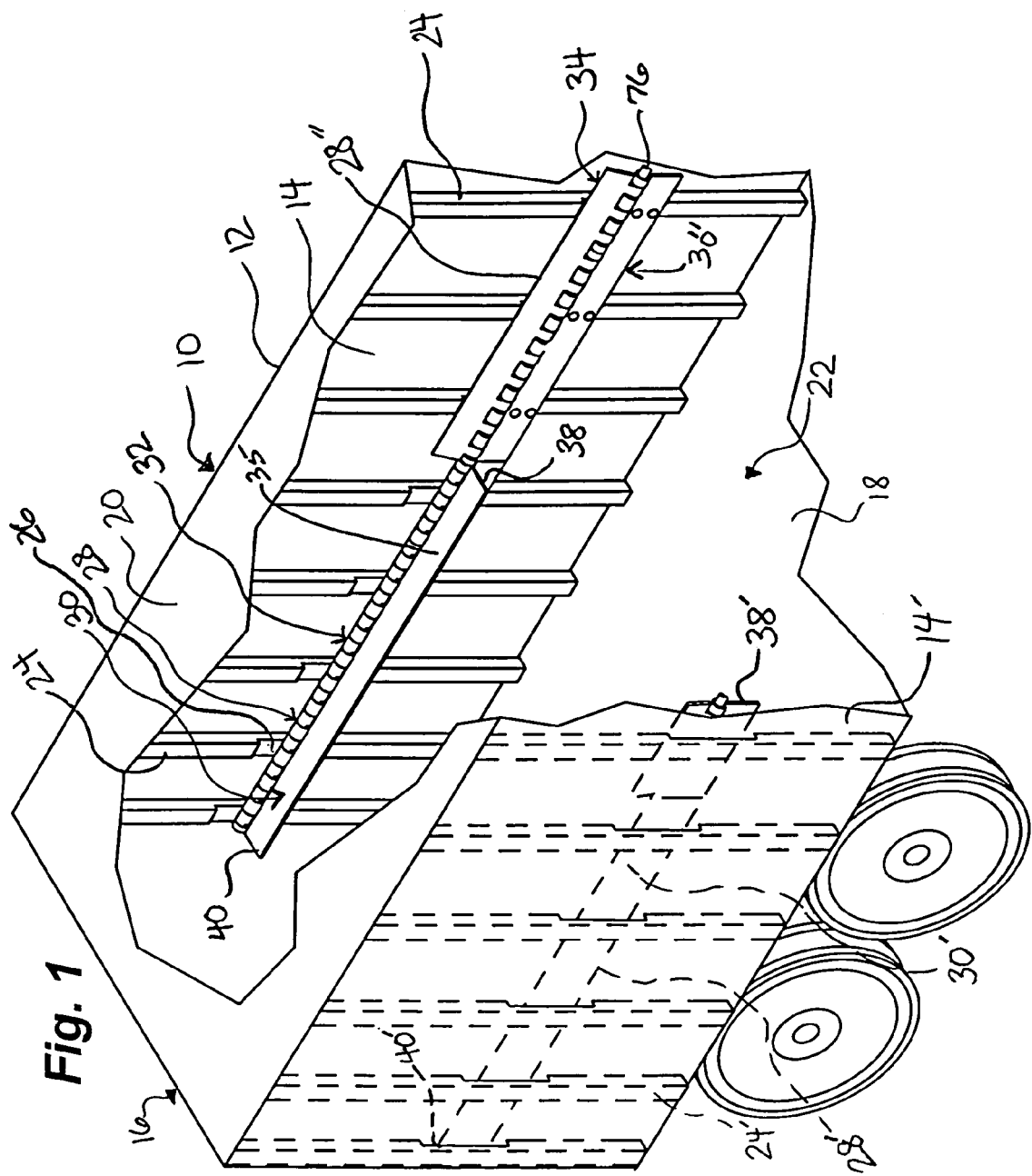
FIG. 1 is a perspective fragmentary view of a lading storage device having a plurality of retractable lading supports in accordance with the present invention.

While this invention is susceptible of embodiment in many different forms, there are shown in the drawings and described in detail herein, several specific embodiments with the understanding that the present disclosure is to be considered as exemplifications of the principles of the invention and is not intended to limit the invention to the embodiments illustrated.

Now referring to the drawings, and particularly to FIG. 1, there is illustrated a lading storage device 10, which in the illustrated embodiment is a railcar, having a body 12 which includes at least one pair of generally opposed walls 14, 14', a front end (not shown), a rear end 16, a bottom 18, and a top 20. Generally opposed walls 14, 14', front end, rear end 16, bottom 18, and top 20 collectively define an interior 22 for lading storage device 10 within which lading may be stowed. Lading storage devices in accordance with the invention include, for example, rail cars, refrigerated rail cars, trailers which hitch to tractor trailer cabs, moving vans, trucks, cargo containers carried by ship or truck and the like as are known in the art.

Opposed walls 14, 14' typically include a plurality of vertical beams or posts 24, 24' directly or indirectly mounted on each of walls 14, 14', respectively, by any suitable structure known in the art, such as by nuts and bolts or welding, for example. Typically, each of vertical posts 24, 24' may include a longitudinal recess 26, 26' which extends substantially along a longitudinal length of each post 24, 24'.

Figure 2:
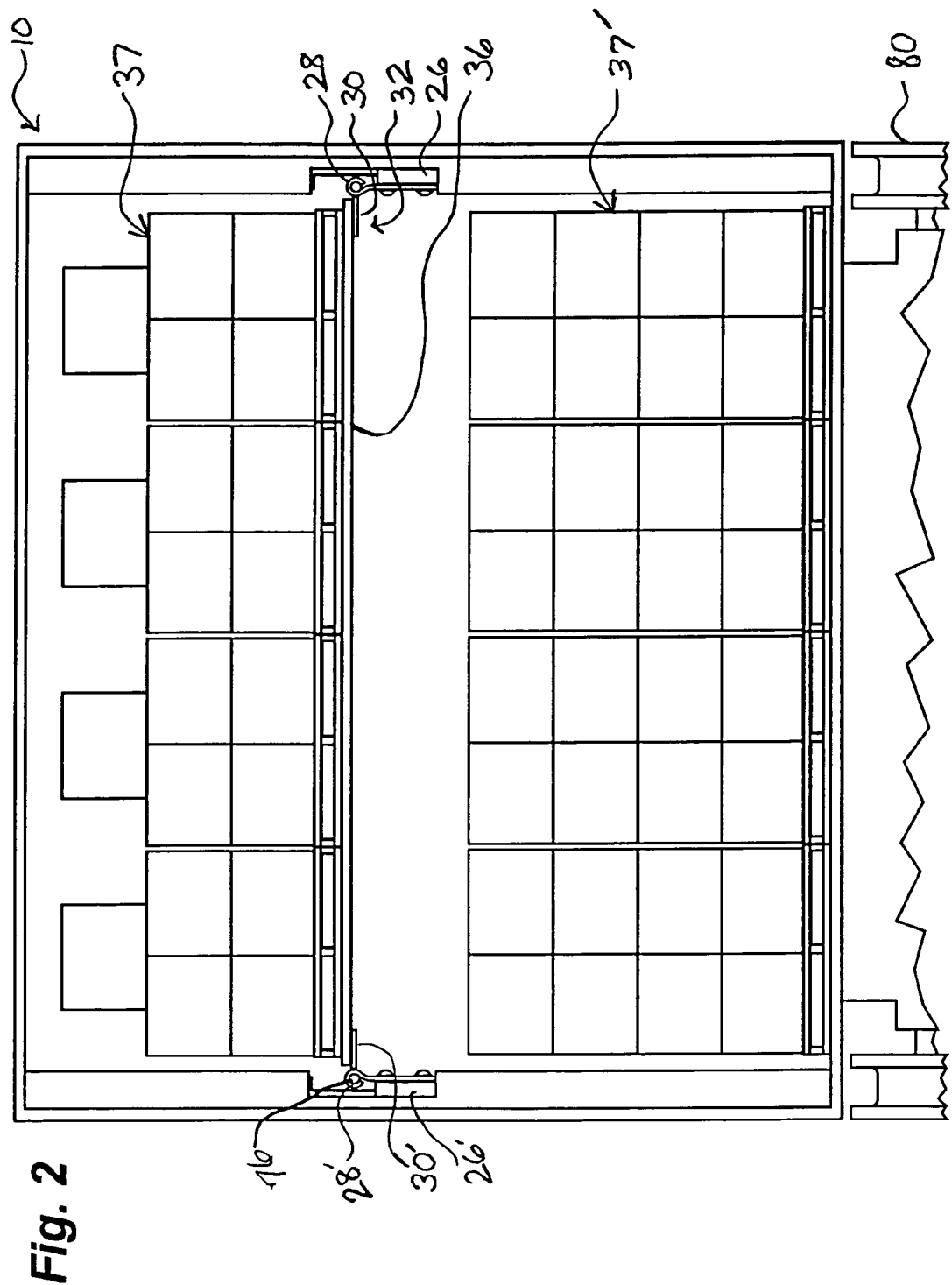
FIG. 2 is a front elevation view of an end of a lading storage device having a lading and lading support member supported by opposed pairs of retractable lading supports.

As shown in FIGS. 1-2, each opposed wall 14, 14' includes a retractable lading support 28, 28' secured to an associated one of walls 14, 14' by any suitable structure and method. By "secured to," it is meant that each retractable lading support may be directly secured to an associated wall or alternatively indirectly secured to an associated wall by any suitable structure or intermediate structure, such as, for example, a post and a mounting bracket as will be described in further detail below.

Each retractable lading support 28, 28' includes a retractable support member 30, 30' which is movable between an extended position 32 as shown by retractable support member 30 in FIG. 1 and a retracted position 34 as shown by yet another retractable support member 30" of retractable lading support 28" in FIG. 1. Preferably, respective retractable support members 30, 30' are in extended position 32 when the load bearing portion 35, which in this case is generally planar, of respective retractable support members 30, 30' is in about a 90° relation to an associated one of walls 14, 14' and are in their retracted position 34 when respective retractable lading supports 28, 28' are fully contained with recesses 26, 26' of walls 14, 14'. As such, retractable support members 30, 30' may be any suitable structure or configuration which is movable between extended position 32 and retracted position 34.

As shown in FIG. 2, when in extended position 32, retractable support members 30, 30' extend into interior 22 of body 12 so that a lading support member 36 may be mounted on any two opposed retractable lading supports 28, 28'. In this way, if lading storage device 10 includes a plurality of opposed pairs of retractable lading supports 28, 28' extending longitudinally along a length of each of opposed walls 14, 14' and a plurality of lading support members 36 are mounted on top of the opposed pairs of the retractable lading supports 28, 28', a two-tiered space is provided substantially through the volume of interior 22 of lading storage device 10. Preferably, lading support member 36 is rectangular in shape and spans substantially from one retractable lading support 28 to its opposed retractable lading support 28'. Lading support member 36 may be formed from any relatively strong material having strength, durability, and a thickness, such as steel.

As is also shown in FIG. 2, when lading support member 36 is mounted on opposed retractable lading supports 28, 28', lading 37 may thereafter be stowed below the mounted lading support member 36 and on top of lading support member 36. Typically, lading 37 is orderly stacked on pallets and thereafter stowed on lading support member 36, but may be stowed by any other method known in the art. While FIG. 2 illustrates a two-tiered system, it is contemplated that any number of tiers or levels could be formed by having more than one row of retractable lading supports 28, 28' on each of opposed walls 14, 14'. Further, opposed retractable lading supports 28, 28' may be vertically disposed on walls 14, 14' or posts 24, 24' of walls as desired creating two or more tiers of an equal height and volume or of a non-equal height and volume.

Figure 4:
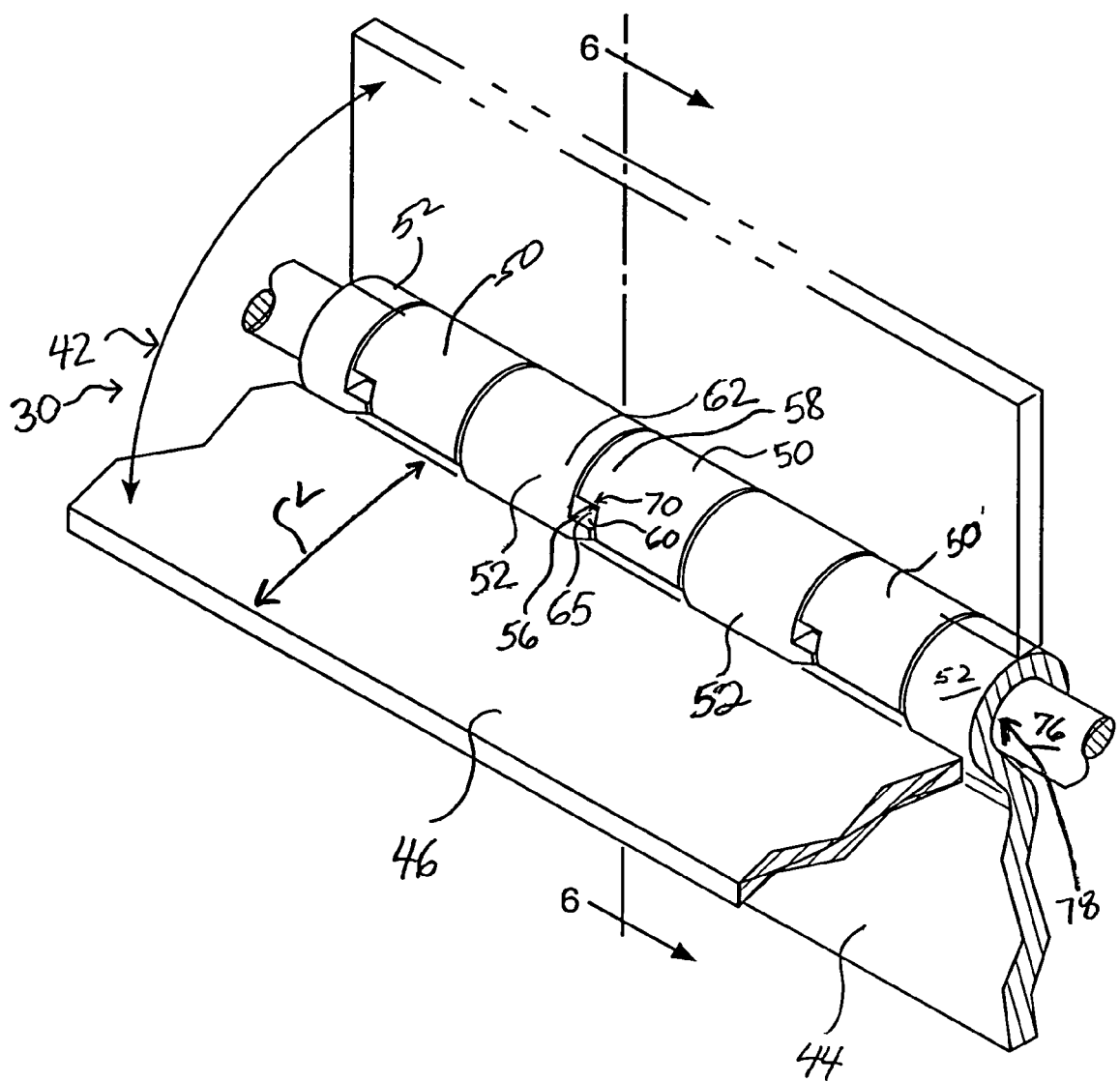
FIG. 4 is a perspective fragmentary view of the retractable lading support of FIG. 3 being moved (rotated) from its retracted position to its extended position.

Retractable lading supports 28, 28' are configured, sized and constructed of suitable material, which may be steel, such that they readily support the weight of lading 37 and lading support members 36 stowed thereon which, as is known in the art, may be substantial weight, particularly for railroad freight cars. As shown in FIG. 4, the preferred length L of the retractable support members 30, 30' is relatively short, such as for example about 3 inches, so as to support the weight on the retractable support members 30, 30' relatively close to the axis of rotation of retractable lading supports 28, 28', defined by pin 76, and to minimize the moment about the axis of rotation of retractable lading supports 28, 28' when in use. In this way, retractable lading supports 28, 28' have a minimal likelihood of failure.

In one embodiment, a preferred length and height for each segment of retractable lading supports 28, 28' is about 12 feet in length and about 7.5 inches in height. Alternatively, retractable lading supports 28, 28' may be of any other size and dimension as is desired. Thus, if lading storage device 10 is a 60 foot railcar as illustrated in FIGS. 1-2, with a door opening of 12 feet on each of walls 14, 14', four 12-foot retractable lading supports 28, 28' may be mounted to extend longitudinally adjacent each other, on each of opposed walls 14, 14' of lading storage device 10.

Additionally, retractable lading supports 28, 28' are typically constructed of a material which is relatively rigid and is of a sufficient thickness to support the weight of lading 37 and lading support member 36 when in use. In one embodiment, retractable lading supports 28, 28' are formed from about ¼ inch or greater carbon steel, but may be formed from any other suitable material. Moreover, in one aspect of the invention set forth below, the strength of each retractable lading support 28, 28' and lading support members 30, 30' is provided by a repeating series of cooperating knuckles that extend from one end 38, 38' of retractable lading supports 28, 28' to an opposite end 40, 40' of retractable lading supports 28, 28'.

Figure 3:
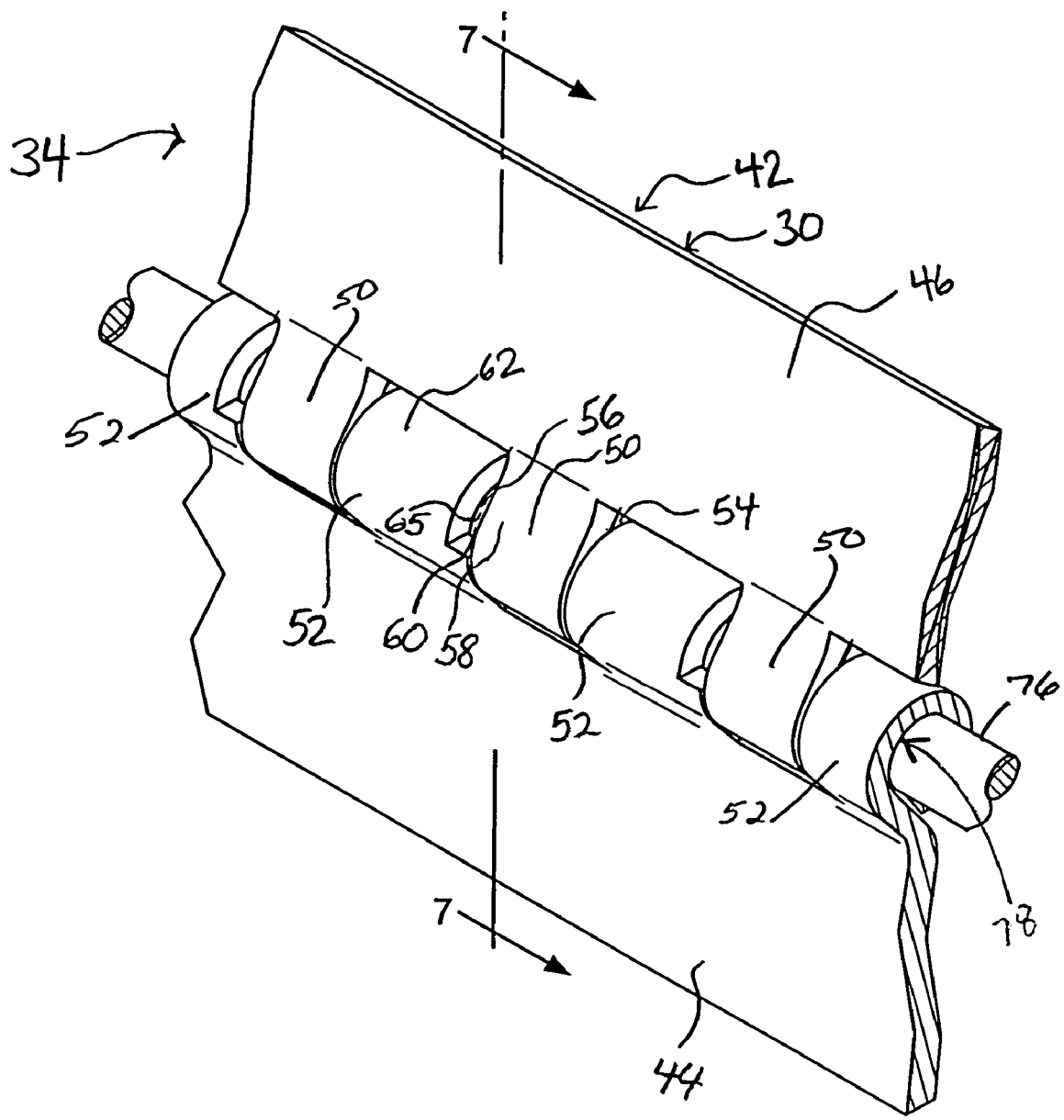
FIG. 3 is a perspective fragmentary view of a retractable lading support disposed in its retracted position in accordance with the present invention.

In one embodiment, as shown in FIGS. 3-4, retractable support member 30 comprises a hinged member 42 having a fixed portion 44 and a retractable supporting portion 46. Retractable portion 46 and fixed portion 44 each have a series of spaced apart cooperating knuckles 50 and 52, respectively. Knuckles 50 may be wider or narrower than knuckles 52 as may be desired. A pin 76 extends through each of knuckles 50 and 52 while in an intermeshing relationship, thereby holding together retractable portion 46 and fixed portion 44. Pin 76 may be suitably constructed of a stainless steel 0.625" diameter pin, for example. The number and length of knuckles 50 and 52 for retractable lading supports 28, 28' is determined by the length of retractable lading supports 28, 28', which may be any suitable length as desired. In one embodiment, retractable lading supports 28, 28' are about 12 feet in length.

Knuckles 50 and 52 enable retractable supporting portion 46 to rotate about the longitudinal axis of pin 76 with respect to fixed portion 44 from extended position 32 to retracted position 34 and vice-versa. As shown in FIGS. 3-4, each of knuckles 50 extends from retractable supporting portion 46 and each of knuckles 52 extends from fixed portion 44. As illustrated, each knuckle 50 cooperates with adjacent knuckles 52. However, it is understood that knuckles 50, 52 need not extend along the entire length of each of retractable lading supports 28, 28', so long as the knuckles included thereon are sufficiently provided so as to support the anticipated weight of any lading 37 and lading support members 36 placed thereon.

Each of knuckles 50 is typically integrally formed with retractable supporting portion 46 and knuckles 52 are typically integrally formed with fixed portion 44 from any suitable relatively rigid material, such as, for example, carbon steel. When assembled, associated knuckles 50 and 52 define a gap 54 therebetween which allows knuckle 50 to rotate with or about pin 76. Knuckles 50 include a curved notch 56 on a coiled portion 58 which overlaps a curved notch 60 on a coiled portion 62 of knuckles 52. Curved notch 60 preferably has a circumference that is slightly greater than a semicircle and that extends about an outer portion of second knuckle 52. Curved notches 56, 60 overlap to collectively define a cavity 65 within which knuckle 50 can rotate with respect to knuckle 52 from retracted position 34 to extended position 32, thereby determining the permitted amount of rotation of knuckles 50 and consequently retractable portion 46.

As shown in FIGS. 3, 4 and 6, hinged member 42 includes a first stop member 64 which prevents retractable supporting portion 46 from rotating to a position below about 90° relative to fixed portion 44. First stop member 64 is defined by an edge 66 of notch 60 of knuckles 52 which when abutted by an edge 68 of notch 56 of knuckles 50 prevents further rotation of knuckles 50 about knuckles 52.

Similarly, as shown in FIG. 7, which is a side elevation view taken along line 7-7 of FIG. 3, hinged member 42 also includes a second stop member 70 which prevents retractable supporting portion 46 from rotating more than about 115°, preferably to about 100°, relative to fixed portion 44 and one of walls 14, 14' when directly or indirectly secured thereto in retracted position 34. Second stop member 70 is defined by a rear edge 72 of knuckles 52 which when abutted by a second edge 74 of notch 60 of knuckles 50 prevents further rotation of knuckles 50 about knuckles 52 beyond about 115°, and preferably beyond about 100°, relative to fixed portion 44.

Figure 5:
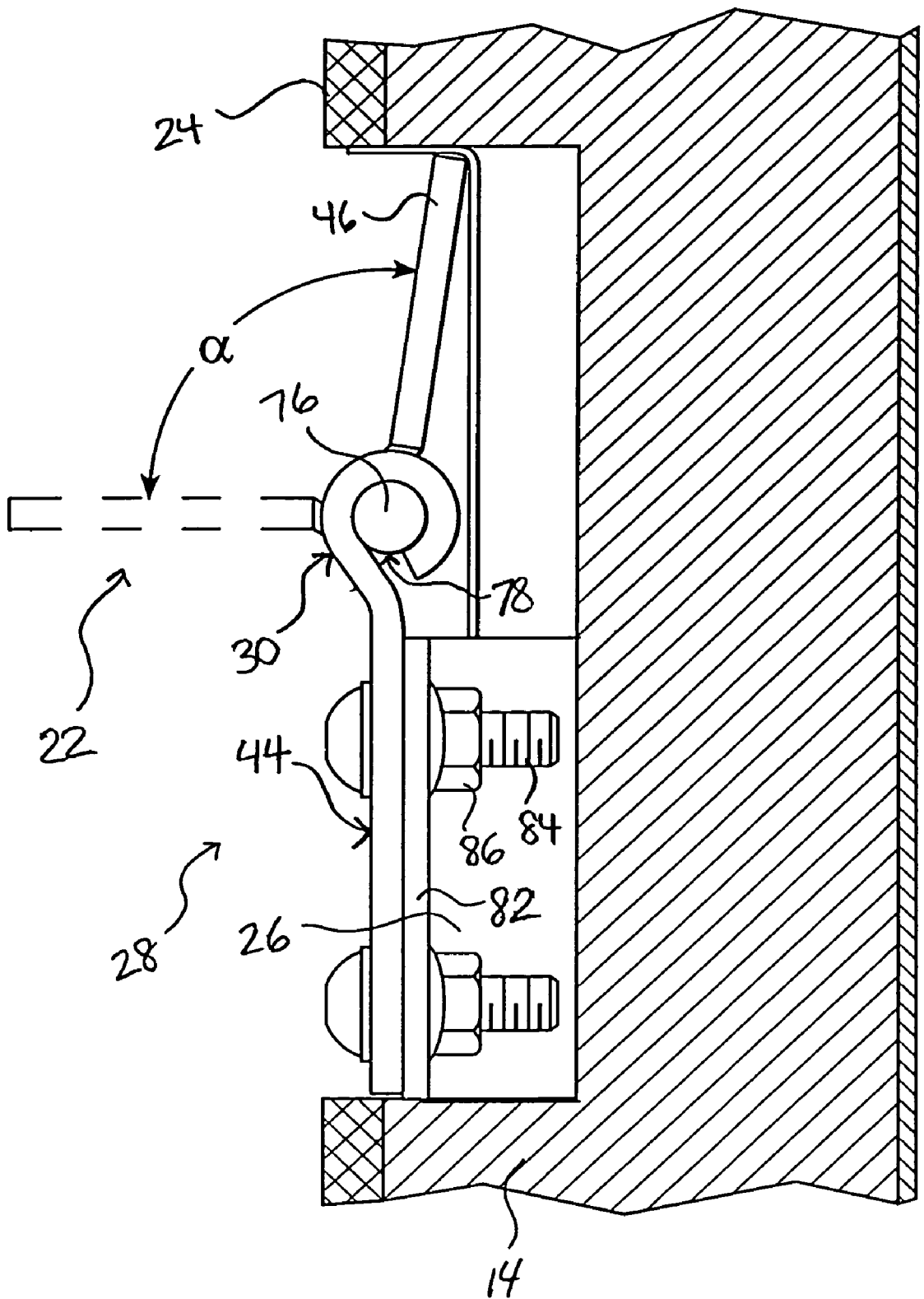
FIG. 5 is a side elevation view of a retractable lading support shown disposed with a recess of a wall of a lading storage device in accordance with the present invention.

As is also shown in FIGS. 3-4 and 5, each of knuckles 50, 52 define a bore 78 for hinged member 42 through which a cylindrical pin 76 may be disposed. Cylindrical pin 76 may be contained within bore 78 by a loose or a frictional fit, and may have a suitable retaining structure which may consist of end caps or nuts (not shown) on the ends of cylindrical pin 76 to prevent movement of pin 76 from bore 78. As such, cylindrical pin 76 may or may not freely rotate along with retractable supporting portion 46 when retractable supporting portion 46 rotates with respect to fixed member 44 of hinged member 42. Cylindrical pin 76 also typically extends longitudinally substantially along an entire length of hinged member 42.

Additionally, if so desired, the ends of coiled portions 58, 62 of each of knuckles 50, 52 of hinged member 42 may be welded at respective ends thereof to provide additional strength to hinged member 42. Further, the ends of knuckles 50, 52 may include a flanged portion (not shown) to facilitate welding the end of coiled portions 58, 62 to a rear portion of knuckles 50, 52.

As shown in FIG. 5, retractable lading support 28 is typically mounted to a vertical post 24 of an associated wall 14 via a mounting bracket 82 which may be within recess 26 of vertical post 24. Fixed portion 44 of hinged member 42 is affixed to mounting bracket 82 by a mating bolt 84 and nut 86, for example, or alternatively by any other suitable structure. Mounting bracket 82 is preferably set back sufficiently within recess 26 such that all components required to mount retractable lading support 28 do not extend outward from recess 26 into interior 22 of lading storage device 10. As shown in FIG. 5, bolt 84 is aligned flush with post 24 and retractable lading support 28 is fully contained within recess 26. As shown in FIG. 5, recesses 26 can be alternatively formed within respective walls 14 instead of posts 24, each of which thus has two separate pieces bounding respective top and bottom of recess 26.

When mounted, retractable supporting portion 46 is movable from retracted position 34, wherein retractable supporting portion 46 is fully contained within recess 26, to extended position 32, wherein retractable supporting portion 46 extends into interior 22 of lading storage device 10, as shown by arrow α. In retracted position 34, retractable lading support 28 is maintained in a generally horizontal position relative to fixed member 44 and one of walls 14, 14' by first stop member 64. However, it is contemplated that retractable supporting portion 46 may be maintained in a position slightly greater than 90° relative to fixed member 44 or walls 14, 14' to reduce the moment about hinged member 42.

Retractable supporting portion 46 may also moved from extended position 32 to retracted position 34 which is between about 90° and about 115° relative to extended position 32, more preferably about 100°. By moving retractable supporting portion 46 to a position greater than 90° relative to its extended position 32, which is substantially horizontal, retractable supporting portion 46 is prevented from undesirably moving to extended position 32 by the typical jostling of the lading storage device 10 when traversing highways, railways or the like.

In operation, lading storage device 10 may be used as follows. First, retractable lading supports 28, 28' are each mounted to one of associated walls 14, 14' directly or indirectly, such as by mounting retractable lading supports 28, 28' to an intermediate structure (vertical posts 24, 24'), as shown by retractable lading support 28 in FIG. 5. In this way, retractable lading supports 28, 28' are fully contained within recesses 26, 26' of walls 14, 14' when in their retracted position 34. Next, each retractable support member 30, 30' of retractable lading supports 28, 28' is moved from its retracted position 34 to its extended position 32 within interior 22 of lading storage device 10 by grasping a portion of each retractable support member 30, 30' or grasping a handle, such as a short strap which may be directly or indirectly secured to retractable support members 30, 30'. When an opposed pair of retractable lading supports 28, 28' are in their extended positions 32, a lading support member 36 may be mounted on top of the retractable support members 30, 30', as shown in FIG. 2.

If a plurality of opposed pairs of retractable lading supports 28, 28' are utilized in a single lading storage device 10, lading support members 36 are typically assembled from one end of lading storage device 10 to the door or rear end 16 of lading storage device 10. Thus, a first lading support member 36 may be mounted as described above and thereafter lading 37, 37' may be stowed below and on top of lading support member 36, typically by loading pallets containing lading 37, 37' by a typical fork-lift vehicle. Thereafter, a second lading support member (not shown) may be mounted on an opposed pair of retractable lading supports in the same manner and lading may be stowed below and on top of the lading support member. Thereafter, as many further lading support members as may be utilized can be assembled by mounting on an opposed pair of retractable lading supports to stow lading below and on top of the assembled lading support member as described herein.

Once loaded with lading 37, 37' as desired, a door 80 of lading storage device 10 is closed and the lading may be transported to a predetermined location by suitable method such as by highway or railway, for example. Once the user arrives at the predetermined location, lading 37, 37' may be unloaded from interior 22 of lading storage device 10 from rear end 16 toward the front end. Thus, typically lading 37 loaded on top of lading support member 36 may be removed by a fork-lift truck or by any other suitable method. Thereafter, lading support member 36 may be removed if desired and lading 37' originally stacked below the lading support member 36 may be removed. Once removed, retractable support members 30, 30' of each retractable lading support 28, 28' is preferably moved to its retracted position 34 within recesses 26, 26' of its associated one of walls 14, 14', as shown in FIG. 5. As a result, retractable support members 30, 30' do not interfere with the subsequent unloading of lading 37' stacked at the bottom 18 of lading storage device 10.

Thereafter, assuming lading storage device 10 includes a plurality of opposed pairs of retractable lading supports and lading support members mounted thereon (not shown), lading may be unloaded from interior 22 of lading storage device 10 from each subsequent assembled lading support member 36 by the same fork-lift truck or by any other suitable method. The lading support member 36 may then be removed if desired and lading 37' originally stacked below lading support member 36 may be removed as set forth above. Once removed, each subsequent retractable support members 30, 30' of retractable lading supports 28, 28' is moved to its retracted position 34 within recesses 26, 26' of walls 14, 14'. As such, the subsequent retractable support members 30, 30' do not interfere with each subsequent unloading of lading 37' stacked below the retractable support members 30, 30'.

While the invention has been described with respect to certain preferred embodiments, it is to be understood that the invention is capable of numerous changes, modifications, and rearrangements without departing from the scope or spirit of the invention as defined in the claims.

The invention claimed is:

1. A lading storage device comprising:
a pair of opposed walls extending in respective substantially vertical planes,
a retractable lading support on each of said walls, said lading supports being in opposed relation to each other and each comprising a retractable support member having a length and being movable between an extended position in which the entire length of said retractable support member extends transversely to the plane of the wall a relatively short distance into an interior of said lading storage device and a retracted position in which the entire length of said retracted lading support extends substantially parallel to said plane of said sidewall, and
a lading support member that spans and is supported by said opposed retractable lading supports when said retractable lading support members are in said extended position.

2. The device of claim 1 wherein said retractable support member comprises a hinged member having a retractable supporting portion, said retractable supporting portion being movable between the extended position wherein said retractable supporting portion extends a relatively short distance into an interior of said lading storage device and the retracted position wherein said retractable supporting portion is generally upright.

3. The device of claim 1 wherein at least one of said walls includes a recess in a portion of said wall, and wherein said retractable lading support is disposed within said recess when said lading support is in the retracted position.

4. The device of claim 2 wherein said hinged member further comprises a fixed portion which is fixedly secured to one of said walls.

5. The device of claim 2 wherein said hinged member is in said extended position when said retractable supporting portion is in about a 90 degree relation to an associated one of said walls.

6. A lading storage device comprising:
at least one pair of generally opposed walls,
a retractable lading support on each of said walls, said lading supports being in opposed relation to each other and each comprising a retractable support member movable between an extended position wherein said retractable support member extends a relatively short distance into an interior of said lading storage device and a retracted position; and
a lading support member that spans and is supported by said opposed retractable lading supports when said retractable lading support members are in said extended position;

at least one of said walls having a recess in a portion of said wall, said retractable lading support being disposed within said recess in a retracted position, so that said lading support is fully contained in said recess when said retractable member is in said retracted position.

7. The device of claim 2 wherein said hinged member includes a stop for preventing said retractable supporting portion from extending into a position below about horizontal when in the extended position.

8. The device of claim 2 wherein said hinged member includes means for preventing said retractable supporting portion from extending into a position below about horizontal when in the extended position.

9. The device of claim 7 wherein said hinged member includes a second stop for preventing said retractable supporting portion from rotating more than about 115 degrees from the extended position.

10. A method of storing lading in a lading storage device comprising:
providing a retractable lading support on each of a pair of opposed side walls of the lading storage device defining an interior body and extending in respective planes, said retractable lading supports being in opposed relation to each other and each comprising a retractable support member having a length and being movable between extended and retracted positions; the entire length of said retractable lading support member extending substantially parallel to the plane of a respective one of said side walls in said retracted position;
moving said retractable support members to said extended position wherein the entire length of each of said retractable support members extends transversely to said plane of said side wall a relatively short distance into said interior body, and placing a lading support member that spans and is supported by said opposed retractable lading supports when said retractable support members are in said extended position.

11. A method of storing lading in a lading storage device comprising:
providing a retractable lading support on each of a pair of opposed side walls of the lading storage device defining an interior body and extending in respective planes, said retractable lading supports being in opposed relation to each other and each comprising a retractable support member movable between extended and retracted positions; said retractable lading support extending substantially parallel to the plane of a respective one of said side walls in said retracted position;
moving said retractable support members to said extended position wherein each said retractable support member extends transversely to said plane of said side wall a relatively short distance into said interior body, and placing a lading support member that spans and is supported by said opposed retractable lading supports when said retractable support members are in said extended position; and
wherein said providing comprises mounting each of said lading supports in a respective recess in said walls so that when in a retracted position, the lading support is fully contained in said respective recess.

12. The method of claim 10 further comprising placing lading on the lading support member.

13. The method of claim 10 wherein said retractable lading support is in said extended position when said retractable support member is in about a 90 degree relation to an associated one of said walls.

14. The method of claim 10 further comprising disposing said opposed retractable support members on substantially the same generally horizontal plane.

15. The method of claim 10 further comprising engaging a stop member associated with said retractable support member to prevent it from extending into a position below about horizontal when in the extended position.

16. The method of claim 12 further comprising thereafter transporting the lading storage device to a desired destination.

17. The method of claim 16 further comprising thereafter unloading the lading from the lading support member.

18. The method of claim 17 further comprising thereafter removing the lading support member from the opposed retractable support members and moving said retractable support members to the retracted position.

19. A lading storage device comprising:
a pair of opposed walls extending in respective substantially vertical planes,
a retractable lading support on each of said walls, said lading supports being in opposed relation to each other and each comprising a retractable support portion having a distal end, wherein said retractable support portion is movable between an extended position and a retracted position, where in the extended position, said retractable support portion extends horizontally in the lading storage device and extends transversely to the plane of the wall a relatively short distance into an interior of said lading storage device and each of said distal ends face inwardly in an opposed relation to each other.

20. The lading storage device of claim 19 wherein said retractable support portions further comprise planar surfaces and wherein when said retractable support portions are in the extended position each of said planar surfaces are in a single horizontal plane.

21. The lading storage device of claim 20 further comprising a lading support member that spans and is supported by the planar surfaces when the retractable support portions are in the extended position.

\* \* \* \* \*